United States Patent
Sunderrajan et al.

(10) Patent No.: US 9,276,896 B2
(45) Date of Patent: *Mar. 1, 2016

(54) METHOD AND APPARATUS OF ESTABLISHING A CONNECTION BETWEEN DEVICES USING CACHED CONNECTION INFORMATION

(75) Inventors: Santhoshkumar Sunderrajan, Goleta, CA (US); Derek Rodrigues, Ojai, CA (US)

(73) Assignee: KASEYA LIMITED, Dublin (IE)

( * ) Notice: Subject to any disclaimer, the term of this patent is extended or adjusted under 35 U.S.C. 154(b) by 520 days.

This patent is subject to a terminal disclaimer.

(21) Appl. No.: 13/169,261

(22) Filed: Jun. 27, 2011

(65) Prior Publication Data

US 2012/0331155 A1     Dec. 27, 2012

(51) Int. Cl.
H04L 29/12       (2006.01)
H04L 29/08       (2006.01)

(52) U.S. Cl.
CPC .......... *H04L 61/103* (2013.01); *H04L 61/6063* (2013.01); *H04L 67/146* (2013.01); *H04L 61/2514* (2013.01)

(58) Field of Classification Search
USPC ........................................................ 709/227
See application file for complete search history.

(56) References Cited

U.S. PATENT DOCUMENTS

| | | | |
|---|---|---|---|
| 7,099,942 B1* | 8/2006 | Wilson et al. | 709/224 |
| 7,174,382 B2* | 2/2007 | Ramanathan et al. | 709/227 |
| 2003/0084162 A1* | 5/2003 | Johnson et al. | 709/227 |
| 2005/0144288 A1* | 6/2005 | Liao | 709/227 |
| 2006/0020688 A1* | 1/2006 | Chang et al. | 709/219 |
| 2010/0030303 A1* | 2/2010 | Haubrich et al. | 607/60 |
| 2011/0264789 A1* | 10/2011 | Cardona et al. | 709/224 |

* cited by examiner

*Primary Examiner* — Angela Nguyen

(57) ABSTRACT

Disclosed are an apparatus and method of caching connection information used to establish a communication connection setup between at least two endpoint devices across a data network. One example method of operation may include exchanging at least one interface address and at least one globally unique identifier between the at least two endpoint devices. The method may also provide retrieving a last successful connection setup information based on the at least one globally unique identifier and the at least one interface address, assigning at least one port number to the at least one interface address via at least one of the two endpoint devices, exchanging at least one rendezvous message between the at least two endpoint devices to share connection setup information, and storing at least one of the at least one interface address, that at least one globally unique identifier, the last successful connection setup information, and the at least one port number in a cache file.

20 Claims, 10 Drawing Sheets

METHOD AND APPARATUS OF ESTABLISHING A CONNECTION BETWEEN DEVICES USING CACHED CONNECTION INFORMATION

TECHNICAL FIELD OF THE INVENTION

This invention relates to a method and apparatus of establishing a connection between at least two endpoint devices over a network, and, more specifically to establishing a fast point-to-point (P2P) connection setup between the at least two endpoint devices using predetermined cached connection information.

BACKGROUND OF THE INVENTION

Peer-to-peer (P2P) technologies have traditionally been employed primarily to share electronic content (i.e., digital files) between multiple users. In particular, P2P technologies enable a single user to query a community of users for specific data file(s). Once located, the requesting user's computer system (endpoint-1) would then connect to the target user's computer system (i.e., endpoint-2, where the desired content is located), and retrieve a copy of the data file(s).

P2P technologies often experience various different connection setup procedures. For example, the endpoint devices attempting to establish a communication link may require address information to be exchanged prior to setting up a P2P connection. Also, third party servers may manage the connection setup procedures, which may require additional operations necessary to establish a P2P connection. For example, local and remote IP addresses, globally unique identifiers, network information, etc., may be required prior to establishing a connection between P2P endpoints.

SUMMARY OF THE INVENTION

One example embodiment of the present invention may include a method of caching connection information used to establish a communication connection setup between at least two endpoint devices across a data network. The method may include exchanging at least one interface address and at least one globally unique identifier between the at least two endpoint devices, retrieving a last successful connection setup information based on the at least one globally unique identifier and the at least one interface address, and assigning at least one port number to the at least one interface address via at least one of the two endpoint devices. The method may also include exchanging at least one rendezvous message between the at least two endpoint devices to share connection setup information, and storing at least one of the at least one interface address, that at least one globally unique identifier, the last successful connection setup information, and the at least one port number in a cache file.

Another example embodiment of the present invention provides an apparatus configured to cache connection information used to establish a communication connection setup with at least one endpoint device across a data network. The apparatus may include a transmitter configured to exchange at least one interface address and at least one globally unique identifier with the at least one endpoint device, and a processor configured to retrieve a last successful connection setup information based on the at least one globally unique identifier and the at least one interface address, assign at least one port number to the at least one interface address via the at least one endpoint device, and exchange at least one rendezvous message between the apparatus and the at least one endpoint device to share connection setup information. The apparatus may also include a memory configured to store at least one of the at least one interface address, that at least one globally unique identifier, the last successful connection setup information, and the at least one port number in a cache file.

DETAILED DESCRIPTION OF THE INVENTION

Figure 1:
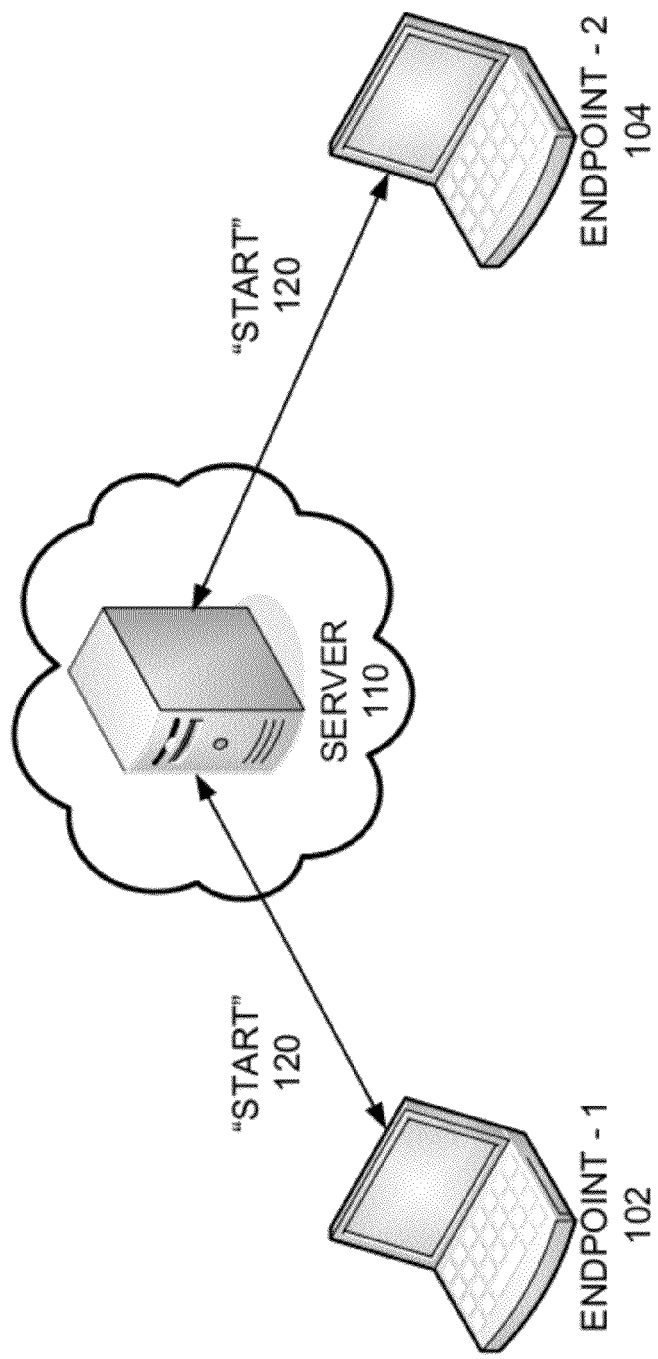
FIG. 1 illustrates an example network configuration configured to establish a start command, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, a system for fast peer-to-peer connection setup between two computers (endpoints) is disclosed. The endpoints may be personal computers (PCs), or other computational devices, such as, laptops, smart phones, tablet PCs, etc. The endpoints may be located in the same or different networks. In operation, the endpoints may be attempting to establish a communication session over an existing network or via a third party server. The endpoints may be attempting to establish a point-to-point connection by using the cached successful connection information from previous connection attempts.

A successful connection may be established when data is exchanged between the endpoints. Unwarranted connection losses and other lack of connection attempts may be recorded and paired with particular device GUIDs, IP addresses and other device related information. The recorded data may be used to perform a health check prior to establishing a connection between one or more endpoint devices. After the end of each connection attempt, the result of the connection may be updated on the cache file. The update procedure may be similar of the same as the retrieval procedure where the record is located and the GUID is matched along with IP addresses. The connection results and the timestamp information may be recorded and referenced during subsequent connection attempts.

Previously successful connection information may include local and remote IP addresses of the endpoints and/or third party servers used to establish the connection. Other connection information may include a remote endpoint's globally unique identifier (GUID) that is stored in a cache file accessible to the endpoints. The communication systems illustrated in FIGS. 1-7 may not require an initial communication between the endpoints in order to exchange their IP address and port numbers (rendezvous messages). As a result, the speed of a connection setup may be increased.

FIG. 1 illustrates an example network configuration configured to establish a "START" command, according to example embodiments of the present invention. Referring to FIG. 1, a central server 110 responsible for managing the communication session issues a "START" command 120 to the endpoints 102 and 104 across a network. The endpoints 102 and 104 may be located on different networks or different subnets of a same network or different subnets of different networks configured to communicate with one another.

Figure 2:
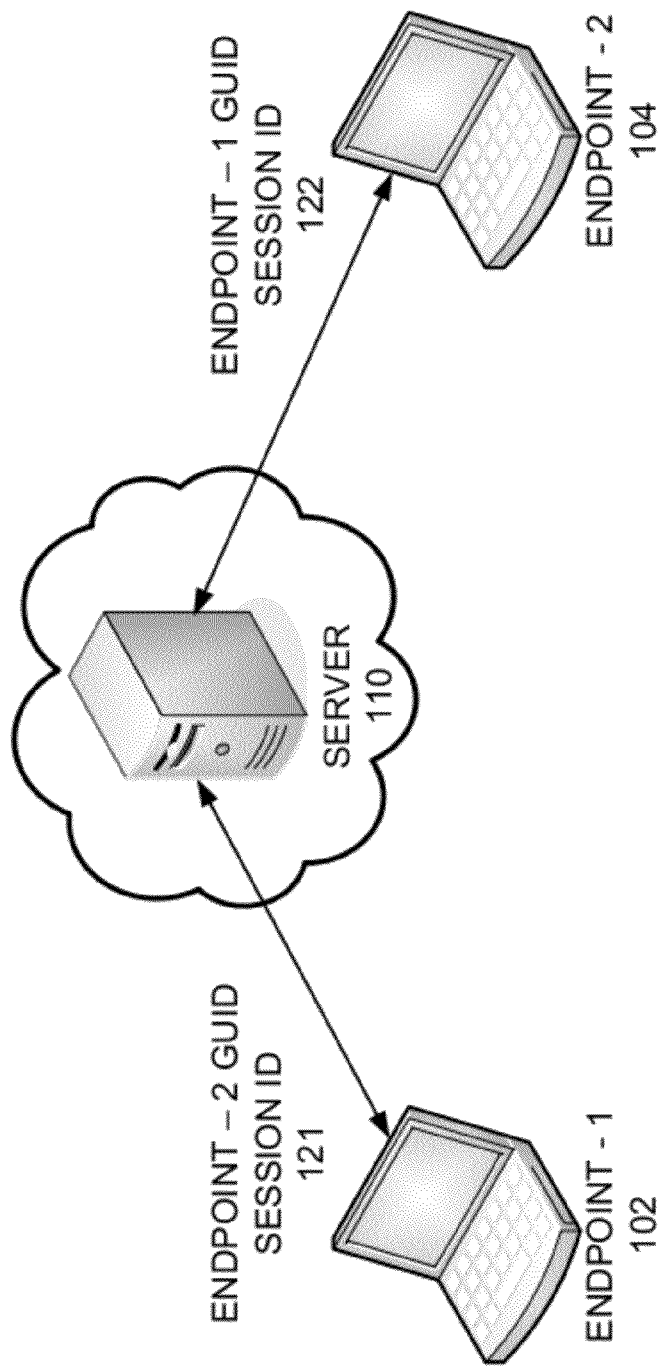
FIG. 2 illustrates an example network configuration configured to exchange communication session information, according to example embodiments of the present invention.

FIG. 2 illustrates additional features according to example embodiments of the present invention, like reference labels refer to like elements. Referring to FIG. 2, along with the "START" command, the central server 110 specifies each of the endpoints' "ENDPOINT GUID" and the "SESSION ID" 121 and 122, respectively. The endpoint information is communicated from one endpoint to another endpoint through the managing server as part of the initial setup.

Figure 3:
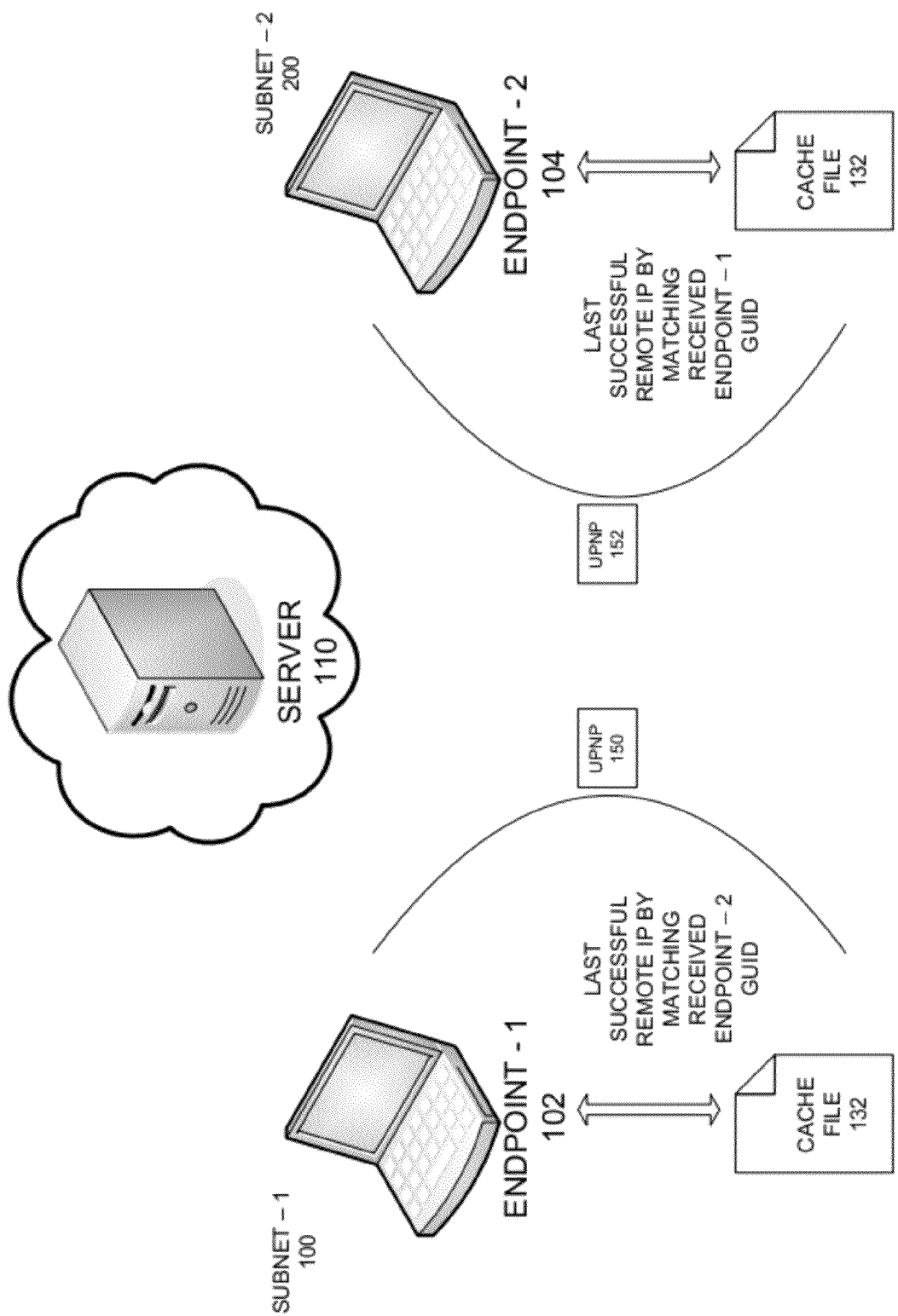
FIG. 3 illustrates an example network configuration configured to retrieve pre-stored endpoint information, according to example embodiments of the present invention.

FIG. 3 illustrates additional features according to example embodiments of the present invention, like reference labels refer to like elements. Referring to FIG. 3, each of the endpoints 102 and 104 retrieve their own IP addresses and the IP address of the other remote endpoint(s). The respective public and/or private IP addresses are retrieved from the cache file 132 based on the received remote "ENDPOINT GUID" received. The endpoints 102 and 104 are located on separate subnets 100 and 200, respectively. As a result, no rendezvous message is required to be exchanged when attempting to locate the endpoints address information. The data in the cache file 132 is stored after each connection attempt thus creating a history of connection attempts. The cache file is updated after each connection attempt and hence they are always up to date. Each endpoint has its own copy of the cache file.

Figure 4:
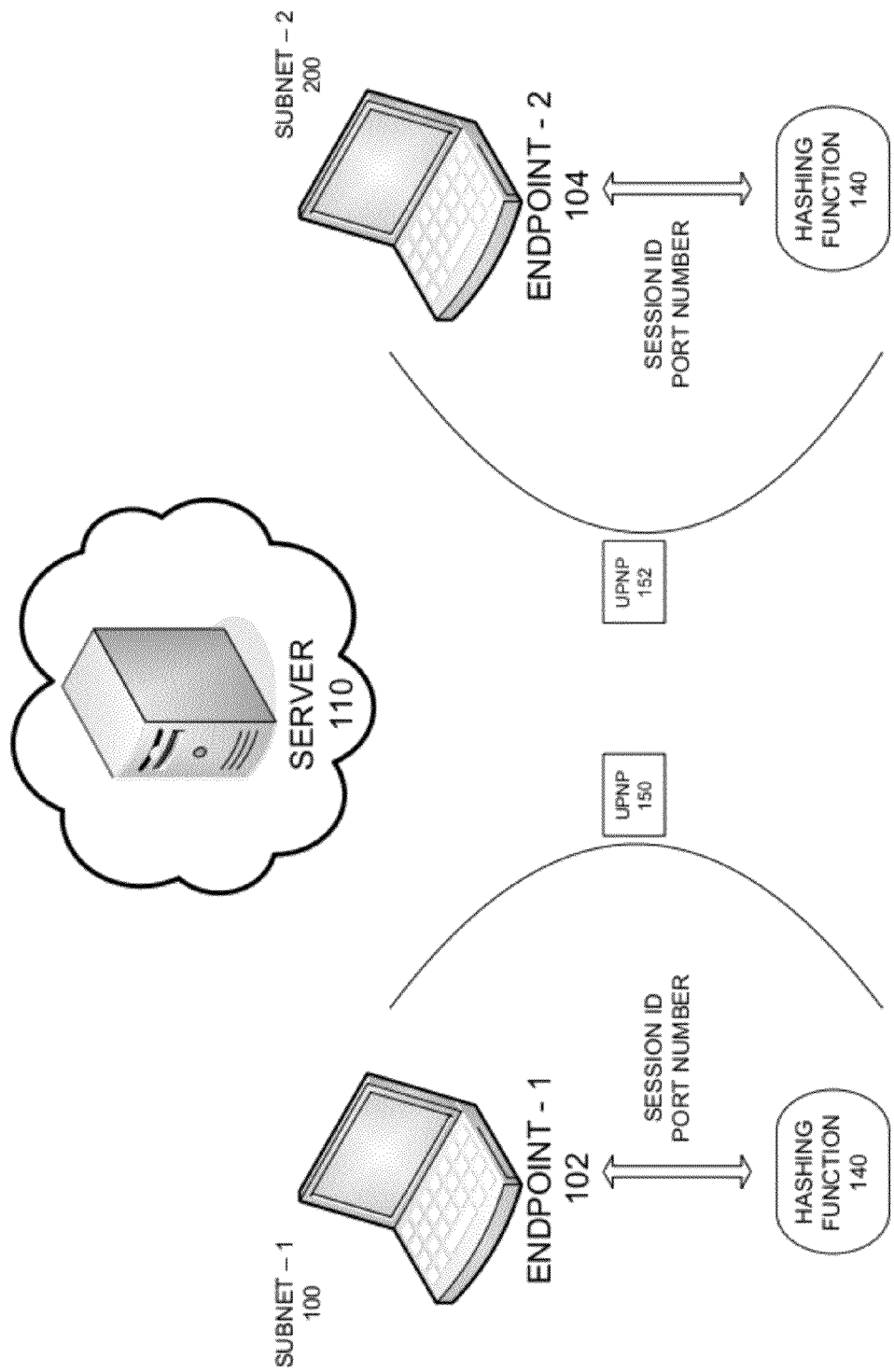
FIG. 4 illustrates an example network configuration configured to implement a hashing function, according to example embodiments of the present invention.

FIG. 4 illustrates additional features according to example embodiments of the present invention, like reference labels refer to like elements. Referring to FIG. 4, a hashing function 140 is used to find a port that will be used to listen for incoming connection requests. The hashing function 140 receives the session ID as an input and outputs a corresponding port number in the range of 1025 to 64000. Since the session ID is the same for either of the endpoints, the hashing function 140 will generate the same "PORT NUMBER" for both the endpoints 102 and 104. As a result, a rendezvous message does not need to be exchanged between the endpoints 102 and 104 as the port numbers are independently known for both endpoints without a communication message.

Figure 5:
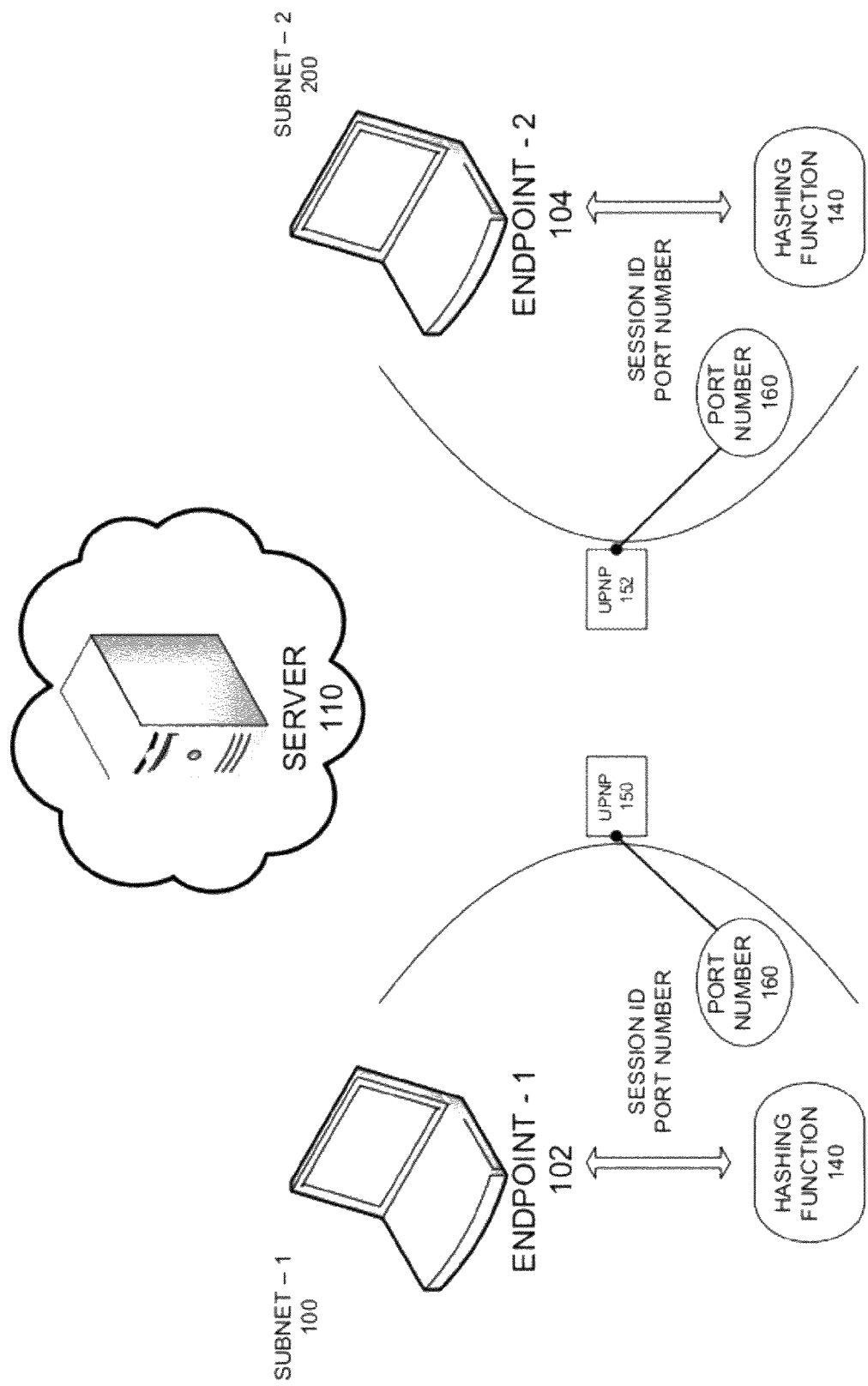
FIG. 5 illustrates an example network configuration configured to implement a mapping function, according to example embodiments of the present invention.

FIG. 5 illustrates additional features according to example embodiments of the present invention, like reference labels refer to like elements. Referring to FIG. 5, the endpoints may map their respective port number assignments 160 to available universal plug and play devices (UPnP) 150 and 152 to enable network address translation traversal (NAT) and user datagram protocol (UDP) hole-punching.

Figure 6:
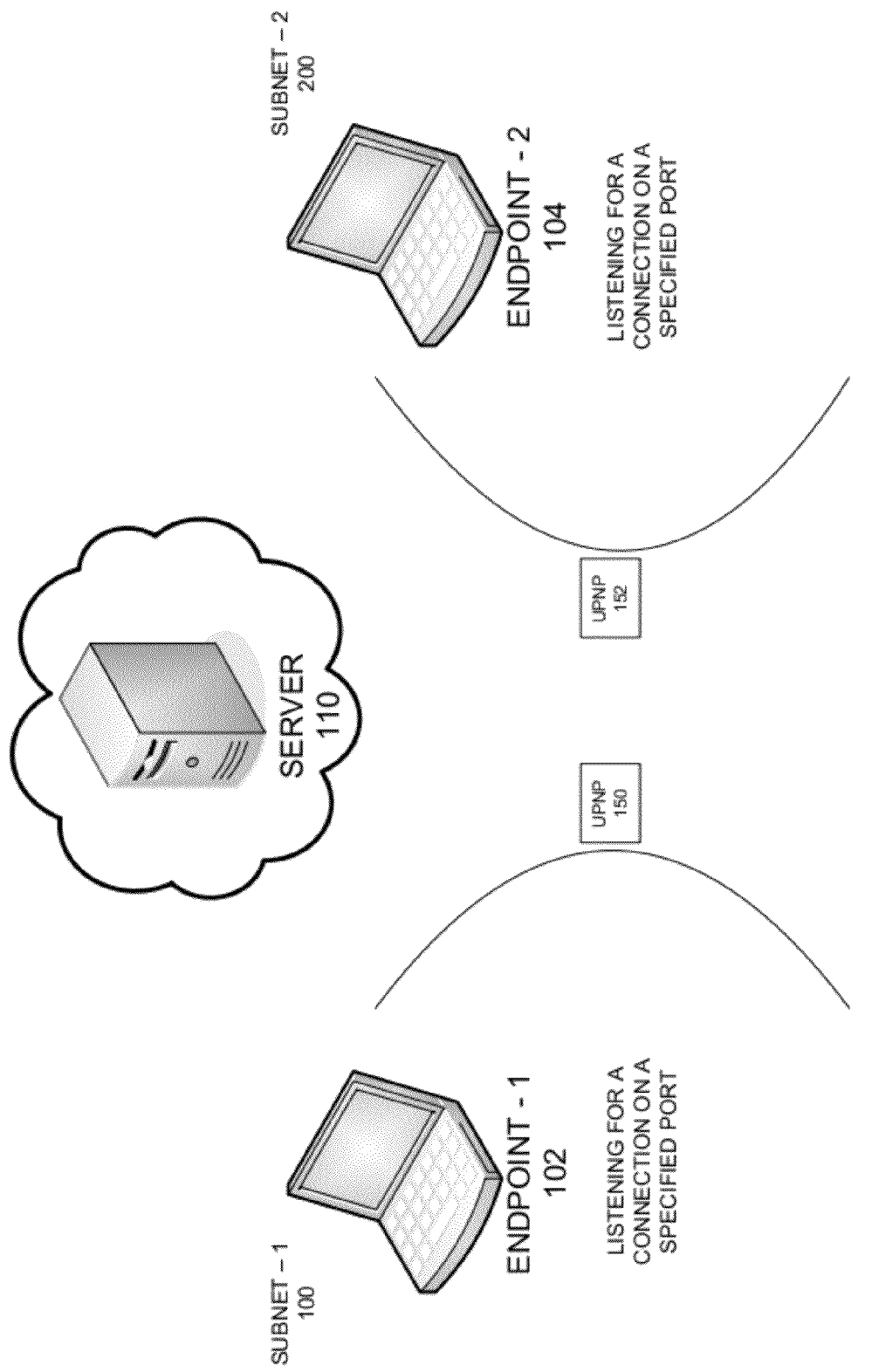
FIG. 6 illustrates an example network configuration configured to perform a listening operation, according to example embodiments of the present invention.
Figure 7:
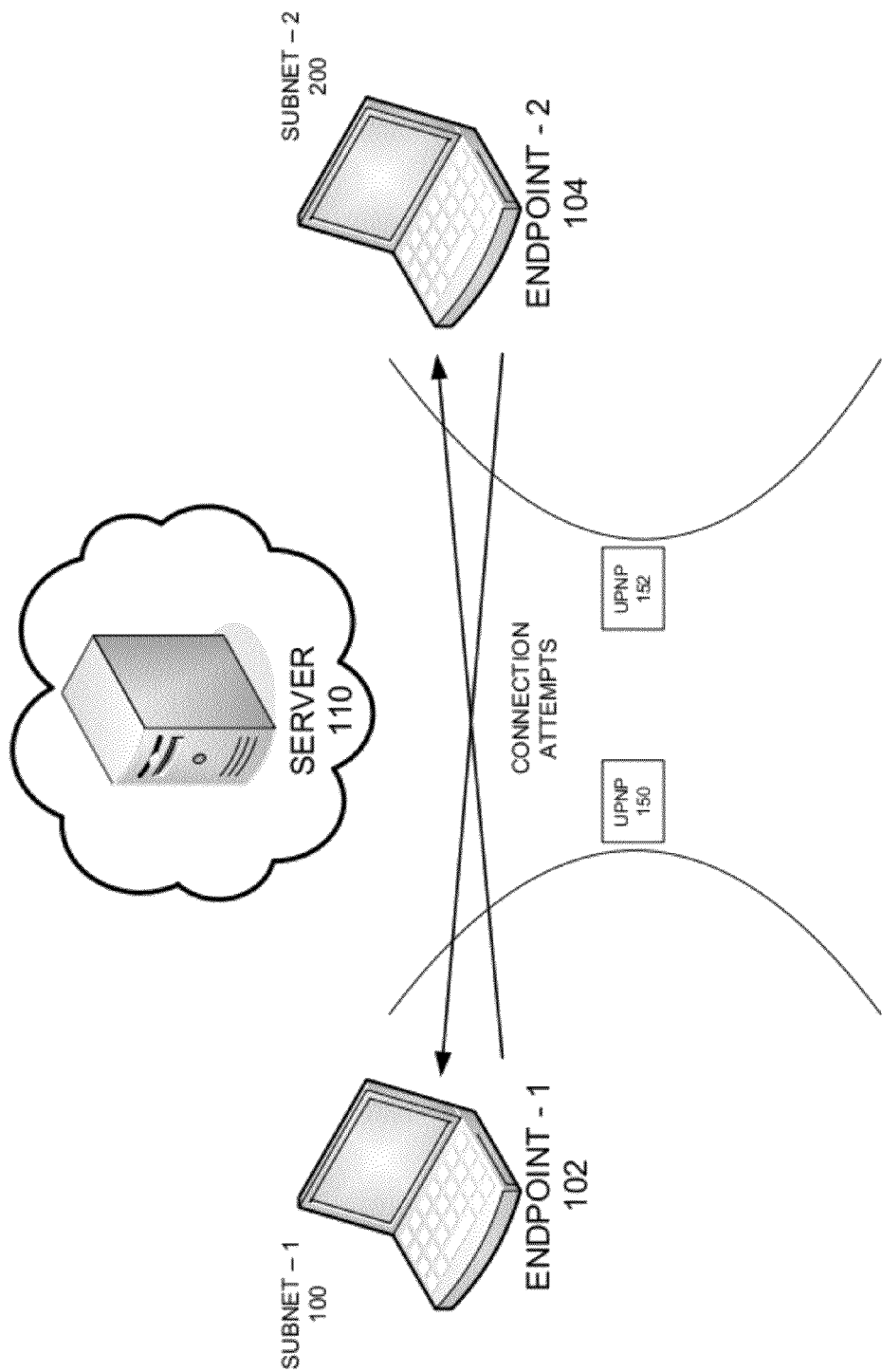
FIG. 7 illustrates an example network configuration configured to perform a port connection operation, according to example embodiments of the present invention.

FIG. 6 illustrates additional features according to example embodiments of the present invention, like reference labels refer to like elements. Referring to FIG. 6, the endpoints 102 and 104 perform listening on both the public and private IP addresses with the specified port assignment. In FIG. 7, the endpoints 102 and 104 connect to each other on a public IP port and a private IP port to establish the peer-to-peer connection.

The private and public IP addresses of an endpoint may be used at the same time. The connection attempts for the private and public IP addresses may be made in parallel. An IP address and a port number pair combine to create a socket address that is used to make a connection at the protocol level. The port numbers assigned to each endpoint may be the same since the same session ID is used to obtain the port number. In order to establish a connection via a connectionless protocol, such as UDP, no end-to-end handshake is required for a session setup. Receiving a successful message from the remote endpoint at the local endpoint would suffice when setting up a connection.

An example cache file may include created and stored as a JSON data string. An example cache file is provided below:

```
{
    "cachedRouteHealthList":
    [
        {"lastTimeFailure":{"utcTime":"0"},
        "previousBest":true,
        "resultList":[
                    {"routeResult":true,
                    "timeStamp":{"utcTime":"1299606050"}}
                ],
        "localRouteIDPointer":{"localPrivateIPAddress":{
"ipAddress":"192.168.37.128"},"localPublicIPAddress":{"ipAddress":-
"65.115.99.226"},
        "remoteGUIDPtr":{"guid":"969e848d-a654-459b-bbb2-
c9b554168f8e"
    },
        "remoteRouteIDPointer":{"remotePrivateIPAddress":{"ipAddress":-
"10.10.42.169"},"remotePublicIPAddress":{"ipAddress":"65.119.-
226.105"}},"
```

-continued

```
upnpRouterDescription":""}}
],
"localGUIDPtr":{"guid":"f3dd3c8a-501b-44de-bd81-6013ae98d141"}
}.
```

The central server 110 sends a globally unique identifier (GUID) of the remote endpoint (endpoint-2) 104 (e.g., GUID=969e848d-a654-459b-bbb2-c9b554168f8e) to endpoint-1 102. Endpoint 102 searches its cache file for a matching GUID that matches the GUID received from the central server 110. Certain information is retrieved from the cache file when matching the remote GUID. An example of the commands used during the matching procedure is provided below:

```
[{"lastTimeFailure":{"utcTime":"0"},
"previousBest":true,"resultList":[{"routeResult":true,"timeStamp":-
{"utcTime":"1299606050"}}],
"localRouteIDPointer":{"localPrivateIPAddress":-
{"ipAddress":"192.168.37.128"},
"localPublicIPAddress":{"ipAddress":"65.115.99.226"},
"remoteGUIDPtr":{"guid":"969e848d-a654-459b-bbb2-c9b554168f8e"},
"remoteRouteIDPointer"
:{"remotePrivateIPAddress":{"ipAddress":"10.10.42.169"},
"remotePublicIPAddress":{"ipAddress":"65.119.226.105"}},
"upnpRouterDescription":""}}]
```

If there were more than one previous connection attempt on the same remote side, a list of connection information similar may also be retrieved from the cache file. Based on the retrieved information, a determination is made as to the previous "best connection." The best connection may be determined based on the amount of time the connection was in place, whether data was exchanged during the connection, or, simply whether the connection was a successful connection. If not, the connection will be deemed unsuccessful and will not be considered a best connection.

As a result of the best connection determination procedure, certain information may be retrieved as provided below: for endpoint 1, localPrivateIPAddress: 192.168.37.128, localPublicIPAddress: 65.115.99.226, and for endpoint 2, remotePrivateIPAddress: 10.10.42.169, remotePublicIPAddress: 65.119.226.105. A pair of local private and public IP addresses may be retrieved at the local end of the connection procedure. At the remote end, a corresponding pair of remote private and public IP addresses may be retrieved from the cache file.

A hash function may be implemented to determine a port number on which to listen for connection attempts. For example, for a session ID=6456778, the hashing function would return a value of 4500. Endpoint-1 102 may bind to port 4500 and map that port onto a corresponding UPnP device. As a result, endpoint-1 102 will begin listening on its own IP addresses corresponding port number (e.g., 192.168.37.128:4500, 65.115.99.226:4500). Similar operations are performed with respect to endpoint-2 104, a common session ID and hashing function are used to discover the port, which would also be port number 4500. The port number may depend on the session ID, which may not be a constant value. Endpoint-2 104 listens for a connection on the following socket public and private IP addresses private: 10.10.42.169:4500 and public: 65.119.226.105:4500.

Once the port designations have been established, both the endpoints 102 and 104 begin connecting with each other since they are aware of the IP addresses of one another and which port number to use for listening purposes. If the previous best connection is not discovered, the connection information with a maximum health value would be used provided that the calculated health value is greater than a threshold health value. The health value may be calculated using established route result values. If no route information is available, no connection attempt will be made.

In accordance with example embodiments of the present invention, when utilizing the cache file, caching may be performed to include previous connection information (e.g., devices, ports, IP addresses, successes, failures, etc.), which may be used in subsequent connection attempts. Once a cache file has been properly updated and stored at each of the endpoints, no rendezvous message exchanges are required between the endpoints prior to setting up a successful connection.

In general, a rendezvous message setup requires that either endpoint should know the other endpoint's IP addresses and corresponding port numbers on which they are listening before attempting to establish a connection. The endpoints may discover their own private IP addresses by querying their own sub-net or local area network. In order to find their public IP addresses, the endpoints may query the STUN server or corresponding UPNP devices. Such a query would take 2-3 seconds on average. By caching the connection information there is no need to perform these time-consuming operations of querying the STUN server or UPNP device, assuming that the network topology is still the same.

Figure 8A:
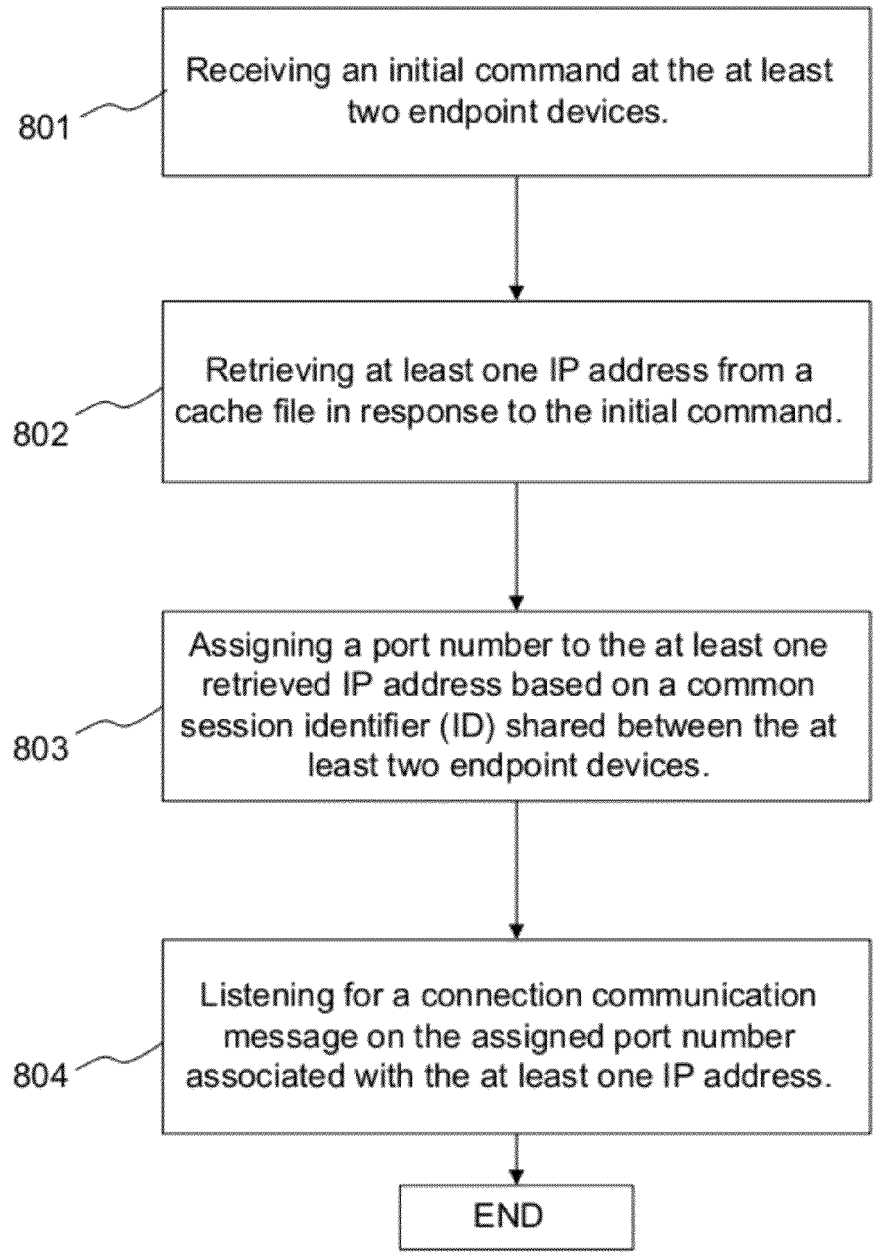
FIG. 8A illustrates a flow diagram of an example method of operation, according to an example embodiment.

FIG. 8A illustrates an example method of operation according to example embodiments of the present invention. Referring to FIG. 8A, the method may provide performing a connection setup between at least two endpoint devices across a data network. The method may include receiving an initial command at the at least two endpoint devices, at operation 801, retrieving at least one IP address from a cache file in response to the initial command, at operation 802, assigning a port number to the at least one retrieved IP address based on a common session identifier (ID) shared between the at least two endpoint devices, at operation 803, and listening for a connection communication message on the assigned port number associated with the at least one IP address, at operation 804.

According to other example embodiments of the present invention, a method and apparatus are disclosed to create, update and store a cache file at local and/or remote endpoints. The cache file 132 may be the same for both the local and the remote endpoints 102 and 104, respectively. The connection information may be stored in the cache file 132 and a health value may be calculated and assigned to the current and/or previously established communication sessions. The health value may be assigned to a particular public and private IP address combination (e.g., socket address), and may be based on previous and/or current success or failure connection attempts.

According to one example, previous connection results are used to discriminate between a good and bad interface while making connection attempts for subsequent sessions. For instance, after each connection attempt between two or more endpoints, certain information may be stored in the cache file 132. Examples of the stored cache file information may include local endpoint public and private IP addresses, remote endpoint local and private IP addresses, local and remote endpoint GUIDs and connection results (i.e., success, failure, etc.). For example, upon establishing a successful P2P connection between endpoint-1 102 and endpoint-2 104, endpoint-1's private and public address information, endpoint- 2's private and public address information, endpoint-1 and endpoint-2's GUID and connection results with corresponding timestamps.

Figure 8B:
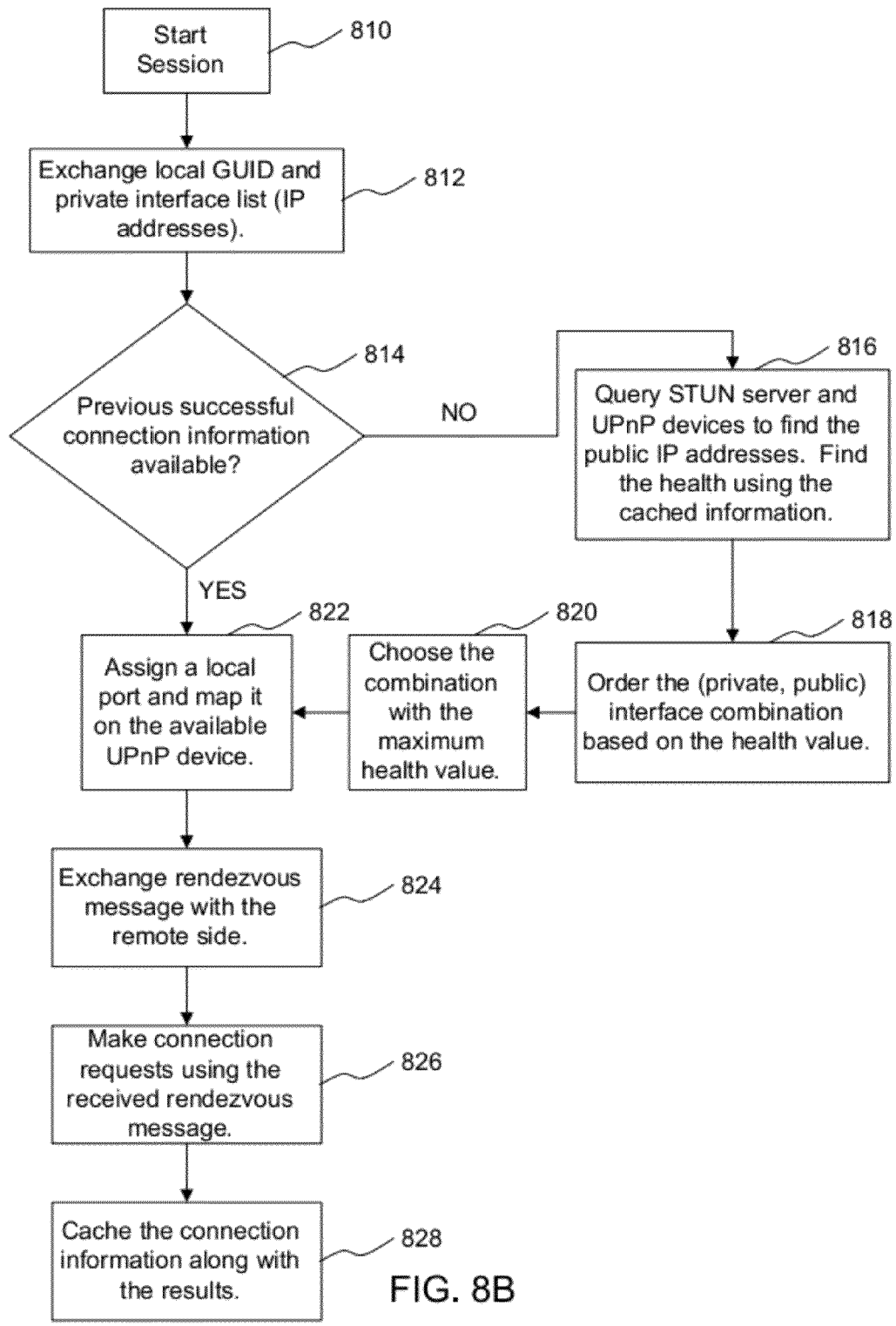
FIG. 8B illustrates another flow diagram of an example method of operation, according to an example embodiment.

FIG. 8B illustrates an example of a communication session information exchange and cache file update procedure, according to example embodiments of the present invention. Referring to FIG. 8B, at the start of a communication session 810, the local and remote endpoints 102 and 104 exchange a list of available private ports and GUID information via a message, at operation 812. The endpoints 102 and 104 determine whether previous successful connection information is available in the cache file 132, at operation 814. If not, the STUN server is queried along with the UPnP devices 150/152 to find the public IP addresses and the health is also referenced using the cached information, at operation 816. A private and public interface combination is ordered assuming the health value is acceptable, at operation 818. The combination with the best or maximum health value is selected, at operation 820. A local port is assigned and mapped to the available UPnP device 150/152. Rendezvous messages may be exchanged with the remote side to ensure that an updated cache, port, and other cache file information is current with both the cache files 132 stored at the endpoints, at operation 824. Connection attempts may be made using the rendezvous messages, at operation 826. The connection information may be cached along with the results, at operation 828.

In operation, the endpoints may retrieve the last successful connection information (e.g., public and private interface addresses) based on the received remote endpoint's GUID, and local and remote private interface lists. The endpoints will assign ports to the private interfaces, which are mapped to the available UPnP devices 150/152. Unlike other example embodiments described above, the endpoints may exchange rendezvous messages to share public and private interface IP and port number information. The endpoints 102 and 104 will use the information in the rendezvous messages to connect with one another, successful and/or failed connection attempts will be recorded and stored in a cache file.

The endpoints may also query the STUN servers and UPnP devices to obtain the public IP addresses for the private interfaces. Based on the received information from the remote endpoint 104, the local endpoint 102 may retrieve the previous connection results from the cache file. The local endpoint may assign a health value for each of the public interface/private interface address combinations. The calculated health values may be ordered according to their respective relevancy scores. In order to calculate a health value, the equation used may be: Health of a Public/Private Interface Combination=Number of previous successful connections/Number of previous connection attempts.

The address combinations with poor health values are discarded and each of the endpoints select the public/private interface combination with the highest health value and assigns them a local port number and maps it to the available UPnP devices 150/152. The endpoints exchange rendezvous messages with each other through a relayed connection and begin connecting with each other through the exchange of rendezvous messages to share updated cache file information. The results for each of the connection attempts are stored in the cache file 132. The connection cycle may be continued while maintaining an updated cache file used to connect the endpoints without requiring the exchange of communication messages across the network.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 9 illustrates an example network element 900, which may represent any of the above-described network components 102, 104, 110, etc.

Figure 9:
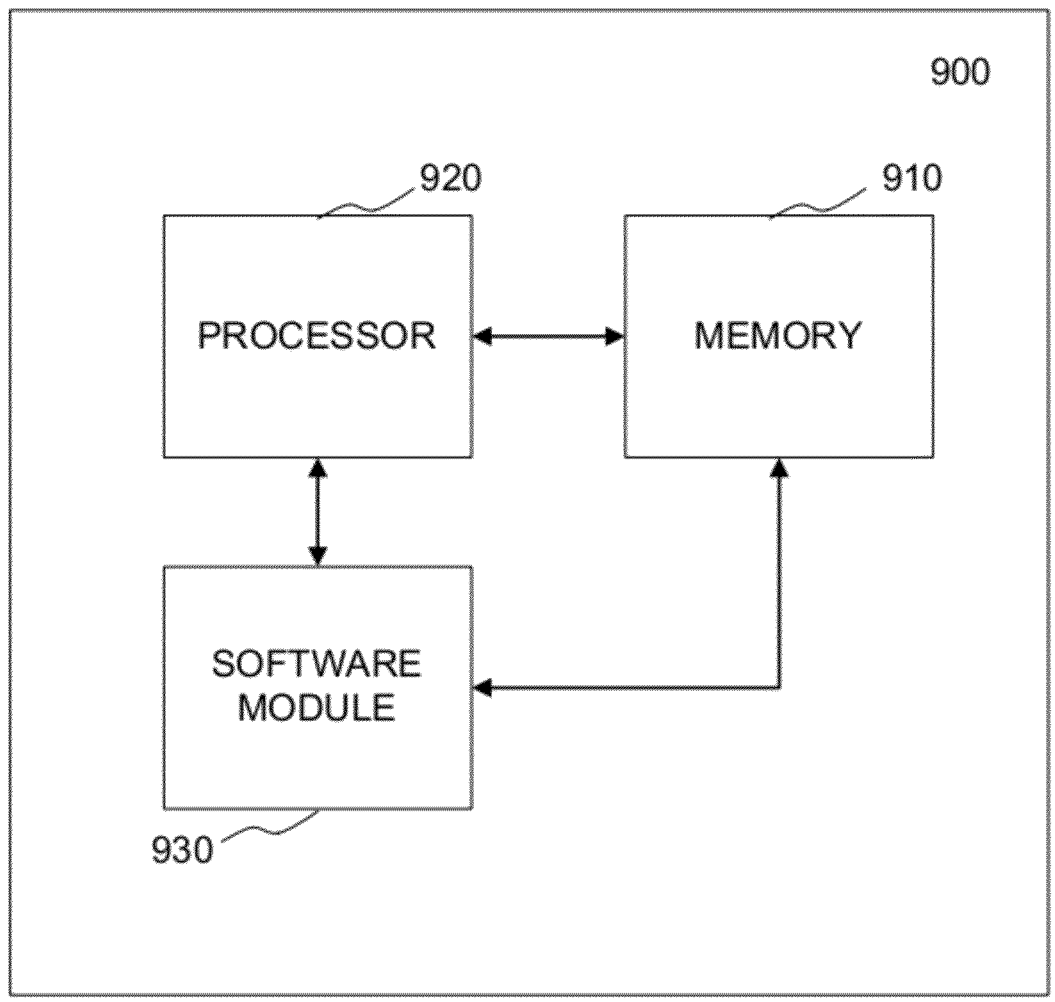
FIG. 9 illustrates an example network entity device configured to store instructions, software, and corresponding hardware for executing the same, according to example embodiments of the present invention.

As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals (not shown).

What is claimed is:

1. A method of caching connection information used to establish a communication connection setup between at least two endpoint devices across a data network, the method comprising:

exchanging at least one interface address and at least one globally unique identifier between the at least two endpoint devices;

retrieving a last successful connection setup information based on the at least one globally unique identifier and the at least one interface address;

determining a health value of the at least one interface address by calculating a number of previous connections established divided by a number of previous connection attempts;

assigning the health value to a particular public and private IP address combination;

assigning at least one port number to the at least one interface address via at least one of the two endpoint devices;

exchanging at least one rendezvous message between the at least two endpoint devices to share connection setup information; and storing at least one of the at least one interface address, that at least one globally unique identifier, the last successful connection setup information, and the at least one port number in a cache file.

2. The method of claim 1, wherein the rendezvous message comprises at least one IP address and the at least one port number.

3. The method of claim 1, wherein the cache file comprises duplicate cache files having the same data stored at both of the at least two endpoint devices.

4. The method of claim 1, wherein the at least one interface address comprises a public IP address and private IP address combination.

5. The method of claim 2, wherein the at least one IP address comprises a public IP address and a private IP address corresponding to at least one of the at least two endpoint devices.

6. The method of claim 4, wherein the public IP address and private IP address combination comprise a socket address.

7. The method of claim 6, further comprising:
storing the determined health value in the cache file.

8. An apparatus configured to cache connection information used to establish a communication connection setup with at least one endpoint device across a data network, the apparatus comprising:
 a transmitter configured to exchange at least one interface address and at least one globally unique identifier with the at least one endpoint device;
 a processor configured to
  retrieve a last successful connection setup information based on the at least one globally unique identifier and the at least one interface address;
  determine a health value of the at least one interface address by calculating a number of previous connections established divided by a number of previous connection attempts;
  assign the health value to a particular public and private IP address combination;
  assign at least one port number to the at least one interface address via the at least one endpoint device;
  exchange at least one rendezvous message between the apparatus and the at least one endpoint device to share connection setup information; and
 a memory configured to store at least one of the at least one interface address, that at least one globally unique identifier, the last successful connection setup information, and the at least one port number in a cache file.

9. The apparatus of claim 8, wherein the rendezvous message comprises at least one IP address and the at least one port number.

10. The apparatus of claim 8, wherein the cache file comprises duplicate cache files having the same data stored at both the apparatus and the at least one endpoint device.

11. The apparatus of claim 8, wherein the at least one interface address comprises a public IP address and private IP address combination.

12. The apparatus of claim 9, wherein the at least one IP address comprises a public IP address and a private IP address corresponding to the at least one endpoint device.

13. The apparatus of claim 11, wherein the public IP address and private IP address combination comprise a socket address.

14. The apparatus of claim 13, wherein the memory is further configured to store the determined health value in the cache file.

15. A non-transitory computer readable storage medium configured to store instructions that when executed by a processor cause the processor to perform caching connection information used to establish a communication connection setup between at least two endpoint devices across a data network, the processor being further configured to perform:
 exchanging at least one interface address and at least one globally unique identifier between the at least two endpoint devices;
 retrieving a last successful connection setup information based on the at least one globally unique identifier and the at least one interface address;
 determining a health value of the at least one interface address by calculating a number of previous connections established divided by a number of previous connection attempts;
 assigning the health value to a particular public and private IP address combination;
 assigning at least one port number to the at least one interface address via at least one of the two endpoint devices;
 exchanging at least one rendezvous message between the at least two endpoint devices to share connection setup information; and
 storing at least one of the at least one interface address, that at least one globally unique identifier, the last successful connection setup information, and the at least one port number in a cache file.

16. The non-transitory computer readable storage medium of claim 15, wherein the rendezvous message comprises at least one IP address and the at least one port number.

17. The non-transitory computer readable storage medium of claim 15, wherein the cache file comprises duplicate cache files having the same data stored at both of the at least two endpoint devices.

18. The non-transitory computer readable storage medium of claim 15, wherein the at least one interface address comprises a public IP address and private IP address combination.

19. The non-transitory computer readable storage medium of claim 16, wherein the at least one IP address comprises a public IP address and a private IP address corresponding to at least one of the at least two endpoint devices.

20. The non-transitory computer readable storage medium of claim 18, wherein the public IP address and private IP address combination comprise a socket address.

* * * * *